United States Patent
Shankar et al.

(10) Patent No.: US 11,113,043 B2
(45) Date of Patent: *Sep. 7, 2021

(54) SPLIT FRONT END FOR FLEXIBLE BACK END CLUSTER PROCESSING

(71) Applicant: Databricks Inc., San Francisco, CA (US)

(72) Inventors: Srinath Shankar, Belmont, CA (US); Eric Keng-Hao Liang, Berkeley, CA (US); Gregory George Owen, San Bruno, CA (US)

(73) Assignee: Databricks Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,074

(22) Filed: Apr. 30, 2020

(65) Prior Publication Data

US 2020/0301684 A1    Sep. 24, 2020

Related U.S. Application Data

(63) Continuation of application No. 16/119,802, filed on Aug. 31, 2018, now Pat. No. 10,691,433.

(51) Int. Cl.
*G06F 8/41* (2018.01)
*G06F 8/54* (2018.01)
(Continued)

(52) U.S. Cl.
CPC .............. *G06F 8/47* (2013.01); *G06F 8/427* (2013.01); *G06F 8/54* (2013.01); *G06F 8/70* (2013.01);
(Continued)

(58) Field of Classification Search
CPC ... G06F 8/47; G06F 8/427; G06F 8/54; G06F 8/70; G06F 11/907; G06F 11/23; G06F 11/0706; G06F 11/0757; G06F 11/3664
(Continued)

(56) References Cited

U.S. PATENT DOCUMENTS

| | | |
|---|---|---|
| 5,838,980 A | 11/1998 | Guillen |
| 6,513,154 B1 | 1/2003 | Porterfield |

(Continued)

OTHER PUBLICATIONS

Yu et al, "GeoSpark: A Cluster Computing Framework for Processing Large-Scale Spatial Data", ACM, pp. 1-4 (Year: 2015).*

(Continued)

*Primary Examiner* — Anil Khatri
(74) *Attorney, Agent, or Firm* — Van Pelt, Yi & James LLP

(57) ABSTRACT

A system for code development and execution includes a client interface and a client processor. The client interface is configured to receive user code for execution and receive an indication of a server that will perform the execution. The client processor is configured to parse the user code to identify one or more data items referred to during the execution. The client processor is also configured to provide the server with an inquiry for metadata regarding the one or more data items, receive the metadata regarding the one or more data items, determine a logical plan based at least in part on the metadata regarding the one or more data items; and provide the logical plan to the server for execution.

23 Claims, 8 Drawing Sheets

(51) Int. Cl.
| | | |
|---|---|---|
| *G06F 8/70* | (2018.01) | |
| *G06F 11/36* | (2006.01) | |
| *G06F 11/07* | (2006.01) | |
| *G06F 21/62* | (2013.01) | |
| *G06F 16/23* | (2019.01) | |
| *G06F 16/907* | (2019.01) | |

(52) U.S. Cl.
CPC ...... *G06F 11/0706* (2013.01); *G06F 11/0757* (2013.01); *G06F 11/3664* (2013.01); *G06F 16/23* (2019.01); *G06F 16/907* (2019.01); *G06F 21/62* (2013.01); *G06F 2201/865* (2013.01); *G06F 2221/2141* (2013.01)

(58) Field of Classification Search
USPC .................................. 717/100–106, 136–143
See application file for complete search history.

(56) References Cited

U.S. PATENT DOCUMENTS

| | | | |
|---|---|---|---|
| 6,523,172 B1 | 2/2003 | Martinez-Guerra | |
| 6,533,172 B1* | 3/2003 | Popp ...................... | G06Q 30/02 235/375 |
| 6,760,907 B2 | 7/2004 | Shaylor | |
| 6,983,320 B1 | 1/2006 | Thomas | |
| 6,985,904 B1 | 1/2006 | Kaluskar | |
| 7,155,706 B2 | 12/2006 | Snover | |
| 7,337,478 B1* | 3/2008 | Lake ................... | A61G 7/1032 5/81.1 C |
| 7,426,721 B1 | 9/2008 | Saulpaugh | |
| 7,496,889 B2 | 2/2009 | Sutter | |
| 7,624,375 B2 | 11/2009 | Santori | |
| 7,694,287 B2 | 4/2010 | Singh | |
| 7,818,666 B2 | 10/2010 | Dorsett, Jr. | |
| 7,873,946 B2 | 1/2011 | Lathrop | |
| 8,180,747 B2* | 5/2012 | Marinkovic ........ | G06F 16/1827 707/704 |
| 8,375,351 B2 | 2/2013 | Ahadian | |
| 8,387,046 B1* | 2/2013 | Montague ............. | G06F 21/566 718/1 |
| 8,615,750 B1 | 12/2013 | Narayana et al. | |
| 8,700,669 B1* | 4/2014 | Glidewell ........... | G06F 11/0727 707/793 |
| 8,875,091 B1 | 10/2014 | Rouleau | |
| 9,081,617 B1* | 7/2015 | Pendharkar ......... | G06F 9/45558 |
| 9,223,554 B1* | 12/2015 | Lawson .................... | G06F 8/54 |
| 9,329,899 B2 | 5/2016 | Ailamaki | |
| 9,396,031 B2* | 7/2016 | Challenger ........... | G06F 9/5027 |
| 9,477,702 B1* | 10/2016 | Ramachandran ... | G06F 16/2393 |
| 9,483,335 B1 | 11/2016 | Wagner | |
| 9,509,783 B1 | 11/2016 | Hayden | |
| 9,577,079 B2* | 2/2017 | Gossner ........... | H01L 29/78621 |
| 9,811,434 B1 | 11/2017 | Wagner | |
| 9,948,655 B1 | 4/2018 | Gerweck | |
| 9,960,974 B2 | 5/2018 | Bai | |
| 10,055,219 B1* | 8/2018 | Olderdissen ............ | G06F 8/654 |
| 10,296,446 B2 | 5/2019 | D'Andrea | |
| 10,417,099 B1* | 9/2019 | Yadav ................. | G06F 9/45558 |
| 10,558,458 B2 | 2/2020 | Iwanir | |
| 10,713,404 B1* | 7/2020 | Schumacher ....... | G06F 11/3624 |
| 2002/0099710 A1 | 7/2002 | Papierniak | |
| 2006/0195829 A1 | 8/2006 | Vincent | |
| 2011/0088014 A1 | 4/2011 | Becker | |

OTHER PUBLICATIONS

Botella et al, "On the Performance of Joint Processing Schemes over the Cluster Area", IEEE, pp. 1-5 (Year: 2010).*
Faud et al, "Processing Performance on Apache Pig, Apache Hive and MySQL Cluster", IEEE, 297-302 (Year: 2014).*
Lee et al, "Scheduling Cluster Tools for Concurrent Processing of Two Wafer Types", IEEE, pp. 525-536 (Year: 2014).*
Kimball et al, "Cluster Computing for Web-Scale Data Processing", ACM, pp. 116-120 (Year: 2008).*
Yao et al, "A Case of Parallel EEG Data Processing Upon a Beowulf Cluster", IEEE, pp. 799-803 (Year: 2009).*
Beetem et al, "Incremental Scanning and Parsing with Galaxy", IEEE, pp. 641-651 (Year: 1991).
Chen et al, "Analyzing Performance-Aware Code Changes in Software Development Process", IEEE, pp. 300-310 (Year: 2019).
Dai et al, "A General Compiler Framework for Speculative Optimizations Using Data Speculative Code Motion", IEEE, pp. 1-11 (Year: 2005).
Drinic et al, "Code Optimization for Code Compression", IEEE, pp. 315-324 (Year: 2003).
Hines et al, "Using De-optimization to Re-optimize Code", ACM, pp. 114-123 (Year: 2005).
Kapfhammer et al, "Testing in Resource Constrained Execution Environments", ACM, pp. 418-422 (Year: 2005).
Park et al, "Concurrent Java Script Parsing for Faster Loading of Web Apps", ACM, pp. 1-24 (Year: 2016).
Thang et al, Model-driven development with optimization of non-functional constraints in sensor network ACM pp. 61-65 (Year: 2010).
Wang et al. "A cloud computing infrastructure on heterogeneous computing resources." Journal of computers, Aug. 2011.

* cited by examiner

SPLIT FRONT END FOR FLEXIBLE BACK END CLUSTER PROCESSING

CROSS REFERENCE TO OTHER APPLICATIONS

This application is a continuation of co-pending U.S. patent application Ser. No. 16/119,802 entitled SPLIT FRONT END FOR FLEXIBLE BACK END CLUSTER PROCESSING filed Aug. 31, 2018 which is incorporated herein by reference for all purposes.

BACKGROUND OF THE INVENTION

Typically, compiled software code is created by a developer and then is executed by a processing system, which these days is often a cluster processing systems. For a cluster processing system, the developer develops (e.g., writes, tests, debugs, etc.) the software using a development environment running on the system for cluster processing, compiles the software on the system for cluster processing, and executes the software on the system for cluster processing. In the event that the user desires to develop software using a local development system, they develop the software on the local development system, compile the software on the local development system, and execute the software on the local development system. Software that is developed on the local development system is not guaranteed to execute correctly on the remote system for cluster processing. In the event that the developer wishes to develop code on the local development system (e.g., because it has customizations preferred by the developer, because it is local and more responsive, because has development software preferred by the developer, etc.) but execute the code on the cluster system (e.g., because it is more powerful than the local development system, because it contains a data set not otherwise accessible to the developer, etc.), a problem is created wherein extra development effort is required of the developer, slowing down development progress.

BRIEF DESCRIPTION OF THE DRAWINGS

Various embodiments of the invention are disclosed in the following detailed description and the accompanying drawings.

DETAILED DESCRIPTION

Figure 1:
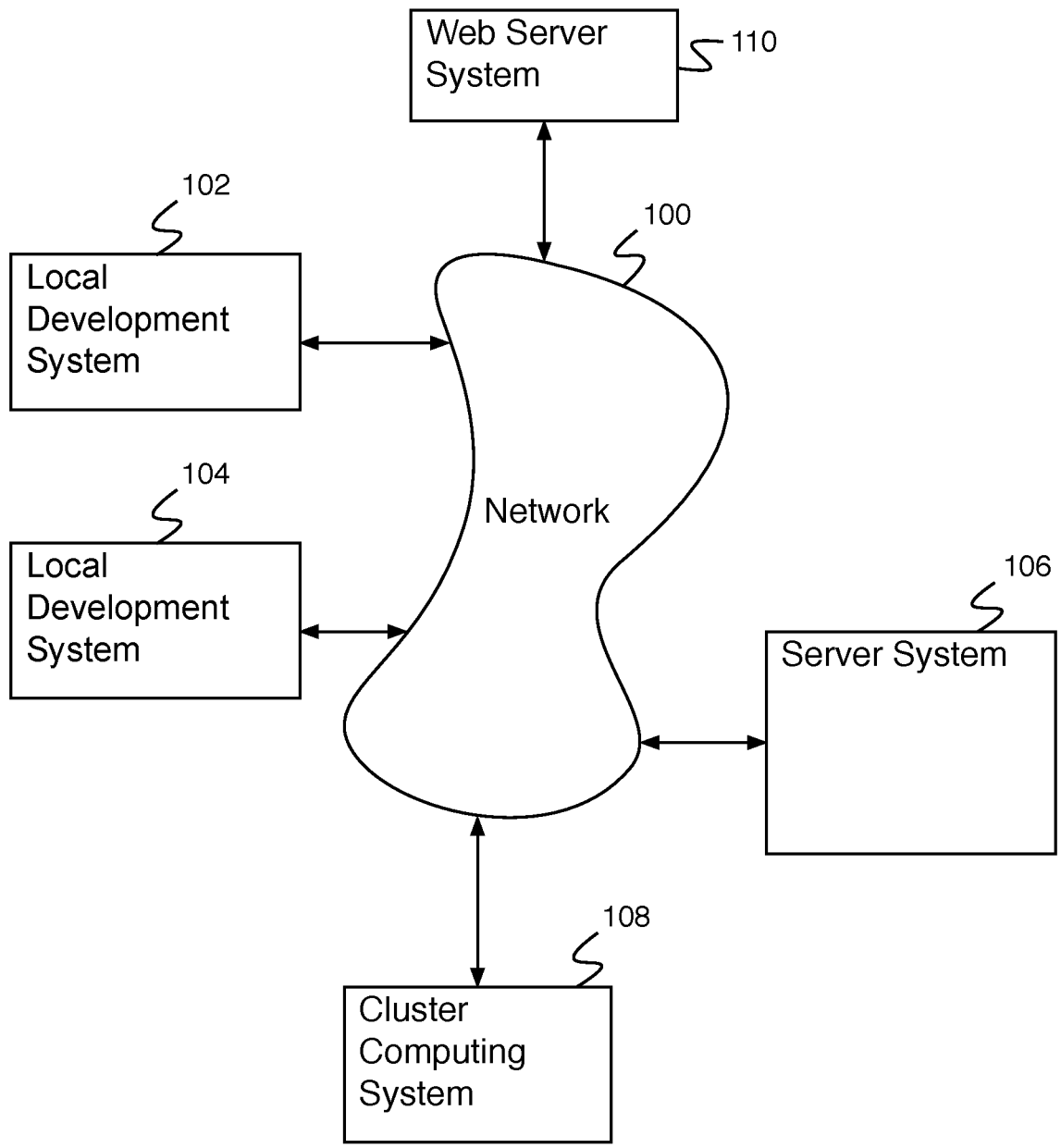
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for code development and execution comprises a client interface configured to receive user code for execution and receive an indication of a server that will perform the execution; and a client processor configured to parse the user code to determine one or more data items tables referred to during the execution, provide the server with an inquiry for metadata regarding the one or more data items, receive the metadata regarding the one or more data items, determine a logical plan based at least in part on the metadata regarding the one or more data items, and provide the logical plan to the server for execution. The system for code development and execution additionally comprises a memory coupled to the processor and configured to provide the processor with instructions.

A system for code development and execution comprises a client system for developing software. The client system comprises a split front end for flexible back end processing. The developer develops code locally on the client system and provides the client system an indication of a server for executing the code. When the developer indicates to compile and run the code, the client system prepares the code for execution on the server. Preparing the code for execution includes parsing the code to determine one or more data items referred to in the execution of the code. In some embodiments, preparing the code for execution on the server comprises determining a preliminary logical plan, wherein the preliminary logical plan identifies one or more data items referred to during the execution. In various embodiments, a data item comprises one of the following: a table, a file, a directory, a database, a catalog, a metadata item, an object store, or any other appropriate data item. The client system requests metadata regarding the one or more tables from the server, receives the metadata, and creates a logical plan based at least in part on the metadata. The logical plan takes into account the metadata information regarding the data items (e.g., a table, a file, a directory, a database, a catalog, a metadata item, an object store, table schema, the table columns, the table rows, etc.). In some embodiments, the logical plan is also based at least in part on the preliminary logical plan, where the preliminary logical plan is updated to create a logical plan. The client system then provides the logical plan to the server for execution. In some embodiments, the logical plan is compiled prior to being provided to the server for execution. In some embodiments, additional information is provided to the server to assist in execution—for example, user defined functions or library information. The server compiles and executes the updated logical plan. During execution the client processor monitors execution of the code, including requesting and receiving intermediate execution results, requesting and/or receiving intermediate state data, and requesting and receiving execution metadata. In some embodiments, intermediate execution results are stored on the server and only intermediate state data is received and stored on the local client system. In some embodiments, intermediate execution results and/or intermediate state data are stored by the client system, allowing software execution to be swapped from the server to a second server.

The system for code development and execution improves the computer system by allowing a client system front end to be transparently coupled to a server system backend, realizing the advantages of both without introducing additional work for the developer.

FIG. 1 is a block diagram illustrating an embodiment of a network system. In some embodiments, the network system of FIG. 1 comprises a system for code development and execution. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Local development system 102, local development system 104, server system 106, cluster computing system 108, and web server system 110 communicate via network 100. In the example shown, local development system 102 and local development system 104 comprise local development systems for use by developers. For example, a developer uses a local development system to interact with a development environment including a user interface to develop code. A local development system includes code compilation and execution tools. For example, the local development system performs an interactive code execution (e.g., a read evaluate print loop) and query analysis. Server system 106 and/or cluster computing system 108 comprise remote systems for developing, compiling and executing code. For example, a developer (e.g., a developer using a local development system or any other system) remotely accesses server system 106 to develop, compile, and execute code. For example, server system 106 and/or cluster computing system 108 comprise resources not available to a developer on a local development system (e.g., very large data sets, powerful computing resources, cluster computing resources, etc.). For example, server system 106 and/or cluster computing system 108 perform query analysis, perform security checks, perform query optimizations, and execute queries. Server system 106 and/or cluster computing system 108 are available to multiple developers (e.g., a developer using local development system 102 and a developer using local development system 104). Local development system 102 and/or local development system 104 comprise a split front end for back end cluster processing. For example, a local development system (e.g., local development system 102 and/or local development system 104) comprises a client interface configured to receive user code for execution (e.g., a development environment including a user interface for receiving user code) and to receive a server indication of a server that will perform the execution (e.g., server system 106 or cluster computing system 108). In various embodiments, server system 106 alone performs execution, cluster computing system 108 alone performs execution with master node and slave node functionality as part of cluster computing system 108, server system 106 and cluster computing system 108 together perform execution (e.g., with server system 106 performing master node functionality and cluster computing system 108 performing slave node functionality), or any other appropriate hardware and/or software systems performing execution. In various embodiments, a web app server sits between network 100 and server system 106 and/or cluster computing system 108. The local development system additionally comprises a client processor configured to parse the user code to determine data item(s) referred to during the execution, provide the server with an inquiry for metadata regarding the data item(s), receive the metadata regarding the data item(s), determine a logical plan based at least in part on the metadata regarding the data item(s), and provide the logical plan to the server for execution. In some embodiments, the parsing of the user code is used to determine a preliminary logical plan that is later used to determine the logical plan. Upon receipt of the updated logical plan and any other appropriate information (e.g., user defined functions, library information, etc.), the server system compiles and executes the code. The local development system is further configured to monitor execution of the code (e.g., requesting and receiving intermediate execution results, requesting and receiving execution metadata, receiving server load, receiving timeout metadata or execution time metadata, etc.). Web server system 110 comprises a web server system for access by a client system (e.g., a user using a user system or a developer using a local development system). The client system accesses web server system 110 for accessing remote systems for developing, compiling or executing code. For example, the client system (e.g., local development system 102 or local development system 104) provides an indication to web server system 110 to access a remote system (e.g., server system 106 or cluster computing system 108). For example, the client logs into web server system 110 (e.g., using a username and password) and receives an authentication token. The token expires after a predetermined duration (e.g., 10 hours). The client provides a remote system identifier (e.g., identifying server system 106 or cluster computing system 108) and a port for connection. The web server uses the token to authorize that the client can connect to the remote system and forwards communications between the client and the remote system.

Figure 2:
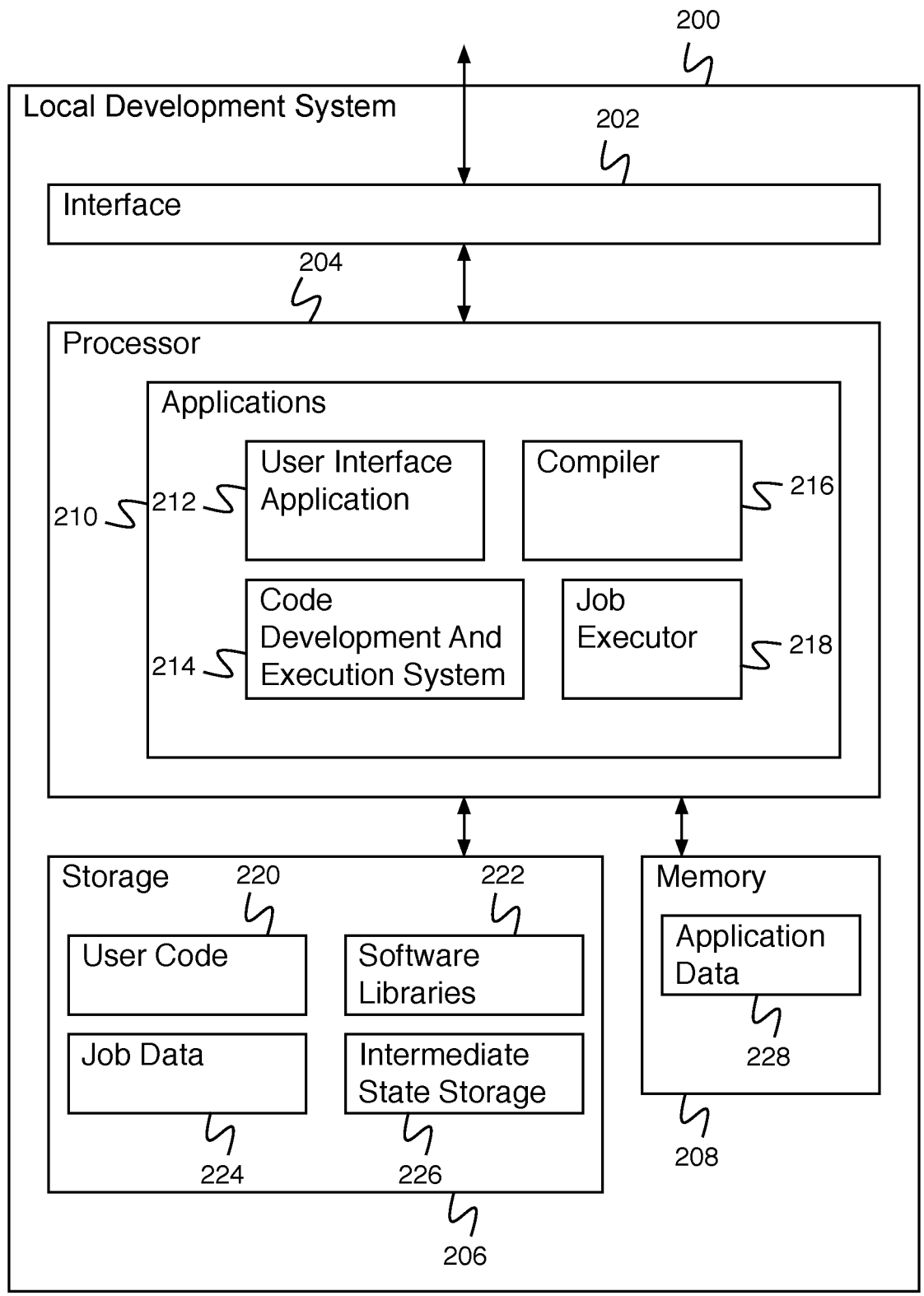
FIG. 2 is a block diagram illustrating an embodiment of a local development system

FIG. 2 is a block diagram illustrating an embodiment of a local development system (e.g., local development system 102 of FIG. 1 or local development system 104 of FIG. 1). In the example shown, local development system 200 comprises a client system for use by a user. Local development system 200 comprises interface 202, processor 204, storage 206, and memory 208. Interface 202 comprises an interface system for communicating with other systems via a network. For example, interface 202 comprises a client interface configured to receive user code for execution and to receive a server indication of a server that will perform the execution. Processor 204 comprises a processor for executing applications 210. Applications 210 comprises user interface application 212 (e.g., a user interface application for interacting with a user—for example, a developer), code development and execution system 214 (e.g., a system for interacting with a developer to develop code, test code, debug code, provide code for compilation and execution, etc.), compiler 216, and job executor 218, as well as any other appropriate user and/or system applications (e.g., a communications application, a chat application, a web browser application, a document preparation application, a data storage and retrieval application, a data analysis application, etc.). A user interacts with code development and execution system 214 via user interface application 212 to develop code and to indicate to execute code. Code is executed locally (e.g., compiled using compiler 216 and executed by job executor 218) or remotely (e.g., compiled and executed by a server system or cluster system accessed via a network). For example, code development and execution system 214 comprises a system configured to parse user code to data item(s) referred to during execution, provide a server with an inquiry for metadata regarding the data item(s), receive the metadata regarding the data item(s), determine a logical plan based at least in part on the metadata regarding the data item(s), and provide the logical plan to the server for execution. In some embodiments, a preliminary plan is determined based at least in part on the parsing of the user code and the logical plan is also based at least in part on the preliminary plan. In some embodiments, the code is compiled prior to providing the code to the server for execution. Storage 206 comprises user code 220 comprising code contributed by a developer for execution and user custom data (e.g., user preferences, user macros, user custom defined functions, user defined libraries, etc.), software libraries 222 comprising external software libraries for supplementing user code, job data 224 comprising data sets for job execution, and intermediate state storage 226 for storing intermediate execution state data (e.g., intermediate execution state data received from job executor 218 or from a job executor on an external server system). Memory 208 comprises application data 228.

In some embodiments, local development system 200 uses a network attached storage system—for example, a cloud storage system. In some embodiments, local development system 200 has no storage system.

Figure 3:
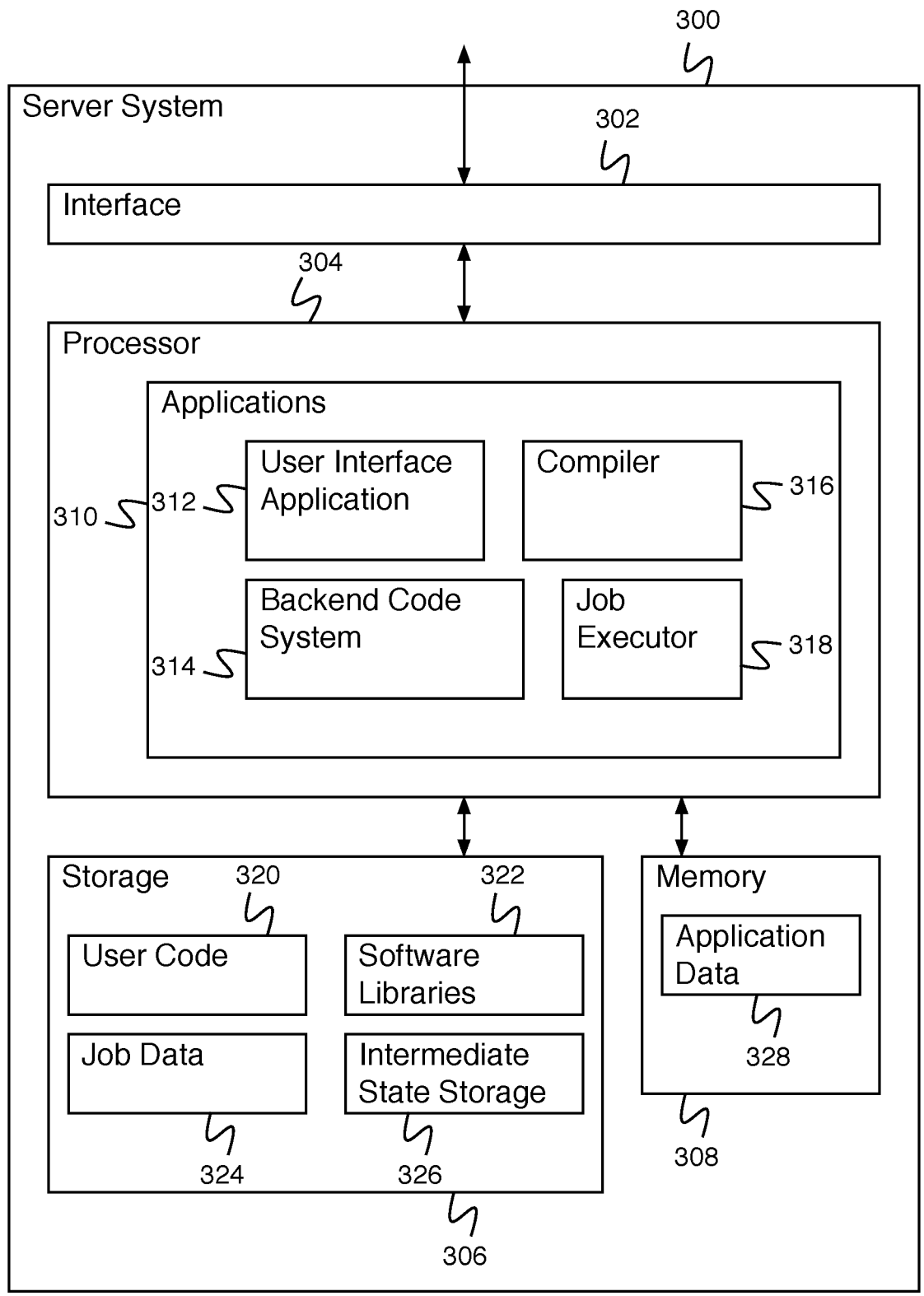
FIG. 3 is a block diagram illustrating an embodiment of a server system.

FIG. 3 is a block diagram illustrating an embodiment of a server system. For example, server system 300 comprises server system 106 of FIG. 1. In the example shown, server system 300 comprises interface 302, processor 304, storage 306, and memory 308. Interface 302 comprises an interface system for communicating with other systems via a network. For example, interface 302 comprises a client interface configured to receive user code for execution and to receive a server indication of a server that will perform the execution. Processor 304 comprises a processor for executing applications 310. Applications 310 comprises user interface application 312 (e.g., a user interface application for interacting with a user—for example, a developer), backend code system 314 (e.g., a system for receiving and processing a remote request to compile and execute code, etc.), compiler 316, and job executor 318, as well as any other appropriate user and/or system applications (e.g., a communications application, a chat application, a web browser application, a document preparation application, a data storage and retrieval application, a data analysis application, etc.). For example, backend code system 314 comprises a system for receiving an execution request comprising a logical plan, preparing the logical plan, providing the prepared logical plan to compiler 316 for compilation to an executable job, and providing the executable job to job executor 318 for execution. A user can also develop code directly using server system 300—for example, interacting with user interface application 312. For example, backend code system 314 receives code developed by the user, prepares the code for compilation, provides the prepared logical plan to compiler 316 for compilation to an executable job, and provides the executable job to job executor 318 for execution. Storage 306 comprises user code 320 comprising code contributed by a developer for execution and user custom data (e.g., user preferences, user macros, user custom defined functions, user defined libraries, etc.), software libraries 322 comprising external software libraries for supplementing user code, job data 324 comprising data sets for job execution, and intermediate state storage 326 for storing intermediate execution state data (e.g., intermediate execution state data received from job executor 318 or from a job executor on an external server system). For example, job data 324 comprises one or more data sets for executing a job. Job data 324 additionally comprises metadata—for example, directory metadata, file metadata, table metadata, directory metadata, configuration information, etc. Memory 308 comprises application data 328.

In some embodiments, storage is decoupled from computation so that, for example, storage for server system 300 is a separate network attached storage system.

Figure 4:
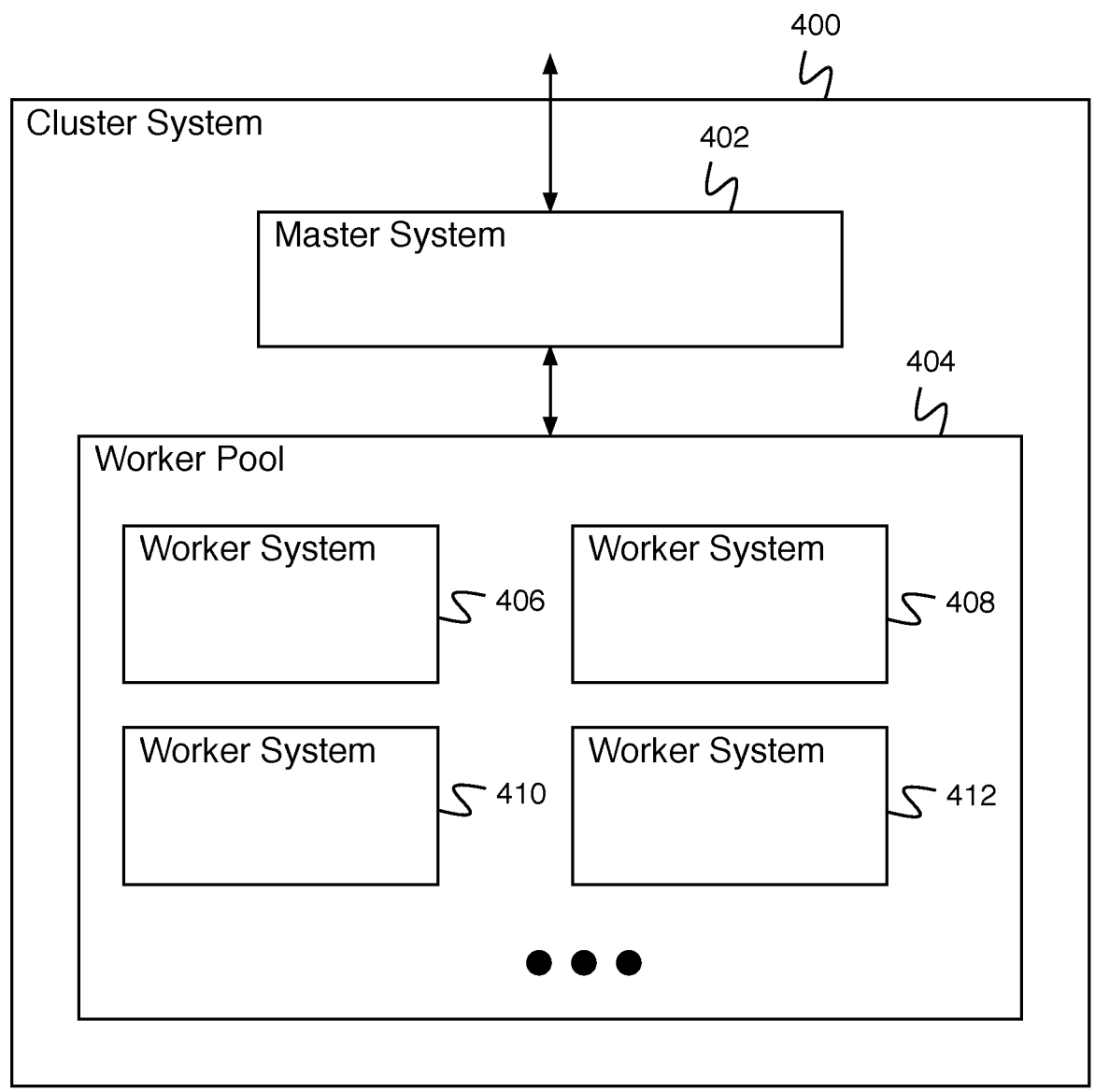
FIG. 4 is a block diagram illustrating an embodiment of a cluster system.

FIG. 4 is a block diagram illustrating an embodiment of a cluster system. In some embodiments, cluster system 400 comprises cluster system 108 of FIG. 1. In the example shown, cluster system 400 comprises master system 402 and worker pool 404. Master system 402 comprises a server system for receiving a job for execution, executing a job, dividing a job into job portions, providing job portions to worker systems of worker pool 404, receiving job portion results from worker systems of worker pool 404, assembling job portion results into complete job results, etc. Master system 402 additionally comprises a server system for receiving job code, compiling job code, executing job code, providing job code for execution via worker pool 404, etc. In some embodiments, master system 402 comprises server system 300 of FIG. 3—for example, including a master system application for performing master system tasks. Worker pool 404 comprises any appropriate number of worker systems (e.g., 4 worker systems, 12 worker systems, 253 worker systems, etc.). Each worker system of worker pool 404 (e.g., worker system 406, worker system 408, worker system 410, and worker system 412) comprises a system for executing jobs. For instance, the worker system receives a job portion from master system 402 and provides job portion results to master system 402. For example, the worker system comprises a worker system for executing other tasks—for example, compiling code, dividing a job into job portions, assembling job portion results, etc. In some embodiments, each worker system comprises a server system as in server system 300 of FIG. 3—for example, including a worker system application for performing worker system tasks.

Figure 5:
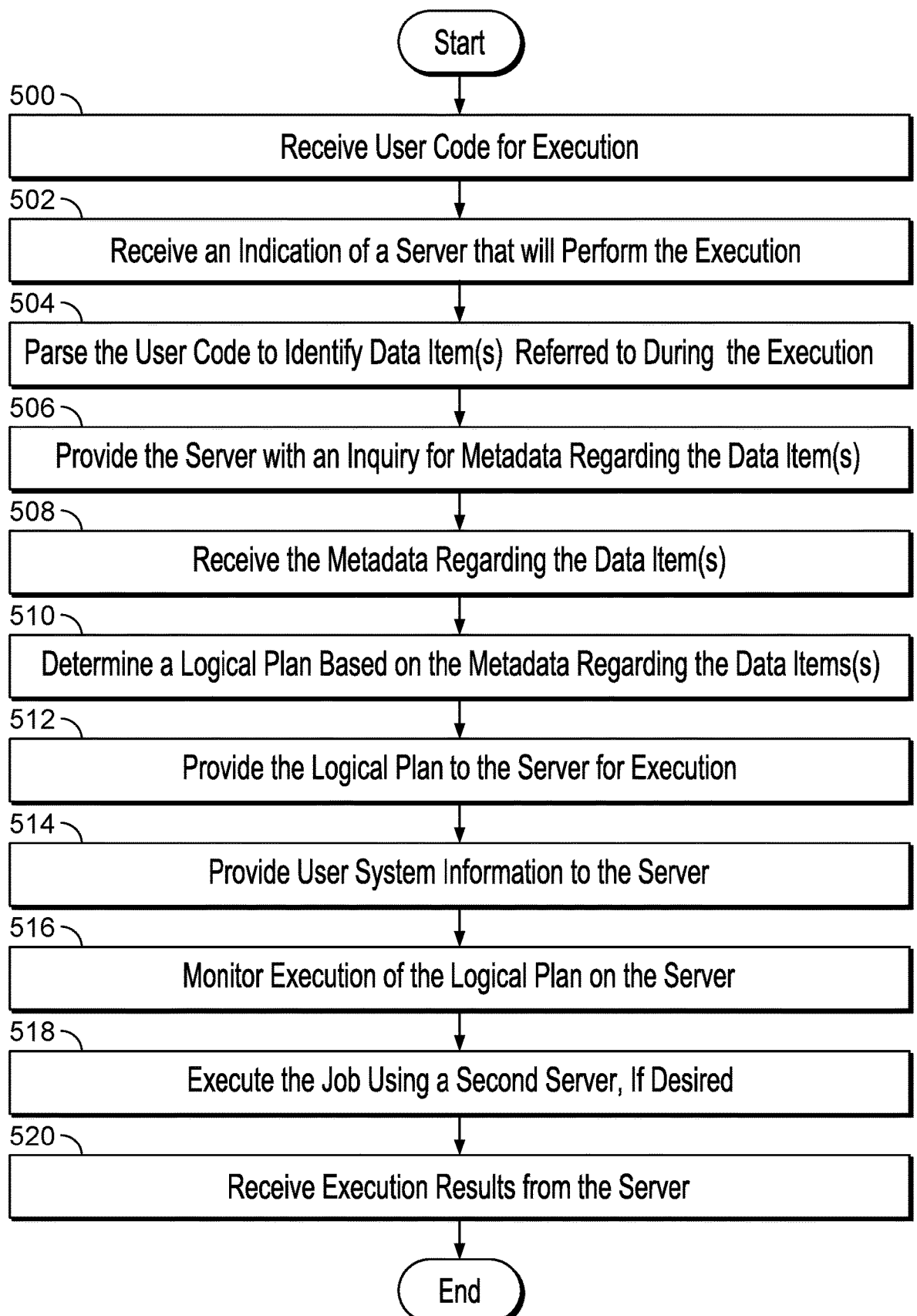
FIG. 5 is a flow diagram illustrating an embodiment of a process for code development and execution.

FIG. 5 is a flow diagram illustrating an embodiment of a process for code development and execution. In some embodiments, the process of FIG. 5 is executed by local development system 200 of FIG. 2. In the example shown, In 500, user code is received for execution. For example, a user provides code to the system and the system also is configured to check security, wherein checking security comprises a user permission to access the client. In 502, an indication of a server that will perform the execution is received. For example, the user provides an indication of server system (a server indication) that the user desires to run the back end processing. In order to use the back end processing, the local development system logs into a webapp or the server for performing the execution (e.g., using a username and password) and receives a security token indicating an authorization to access the server. Note that in some cases a second security check occurs when the user provides a query and the system checks whether the user has access to the data referred to by the query. The local development system provides an indication of the server or cluster system and port to connect to. Calls from the local development system to the server include the security token to indicate authorization. The server will use the token to authorize the client.

In 504, user code is parsed to identify data items (e.g., table(s), file(s), directory(ies), object store(s), etc.) referred to during the execution. For example, the user code is analyzed during parsing to identify data items that are referred to and will be used during execution of the code. In some embodiments, a preliminary plan is developed using information derived from parsing the user code. In one case, a user structured query language (SQL) code received for execution is SELECT*FROM TABLE WHERE USER=jdo@databricks.com. The system processes the code by:
  a) parsing the SQL code on the local machine
  b) understanding the tables referenced on the local machine
  c) asking the server—what does the table contain? Please tell me metadata (e.g., the schema) related to the table.
  d) receiving the server response—TABLE has 1000 rows, 3 columns, column 1—personname, column 2—location, column 3—user
  e) recognizing (as a $2^{nd}$ step of parsing) that the code filters based on user column and returning all the columns
  f) constructing a preliminary plan that says scan TABLE, filter column, project all In another case, a user code received (spark.table("TABLE") .filter("user=jdo@databricks.com")) is examined for what API it might be calling. The system processes the code by:
  1. parsing the code,
  2. recognizing that it is asking to call table.read API
  3. asking the server—what does the table contain? Please tell me metadata (e.g., the schema) related to the table.
  4. receiving a server response—TABLE has 1000 rows, 3 columns, column 1—personname, column 2—location, column 3—user
  5. constructing a preliminary plan that is table.read.filter (user=jdo@databricks.com)

In 506, the server is provided with an inquiry for metadata regarding the data item(s). For example, an inquiry for metadata regarding the data item(s) (e.g., table(s), file(s), directory(ies), object store(s), etc.) comprises an inquiry for all available metadata. As another example, the local development system provides the server system with an inquiry regarding the data item(s) determined when the user code was parsed. In order to access the server's metadata information, the processor is additionally configured to check security, wherein checking security comprises a user permission to access table metadata via a server query. For example, metadata comprises directory metadata (e.g., files in the directory, sizes of files in the directory, date created, directory name, user who created file or who owns file, permission information, etc.), file metadata (e.g., file size, file owner, file creation date, file permissions, file name, file deletion information, etc.), or table metadata (e.g., table schema, a table column, a table column label, a table column type, a table row, a table row label, a table create time, table partition columns, permission information, statistics (e.g., average length of column, row, table size, etc.), etc.). In some embodiments, in addition to the metadata, the system provides an inquiry for configuration information, wherein the configuration information comprises configuration settings on how to process data, configuration of case sensitivity of table, configuration for resolving data, and/or configuration for ordering of joins, In 508, metadata regarding the data item(s) is received. In 510, a logical plan is determined based at least in part on the metadata regarding the data item(s). For example, a plan may revise a preliminary plan, if available, due to information learned from the metadata. As an example, the metadata may indicate that a table only contains certain information or no information so that the query can be limited or eliminated in the logical plan. As another example, the metadata indicates that a table is a view (a query on another table) and the logical plan substitutes the query on the other table for the table reference in the code. As yet another example, the ordering of the plan is changed based on the metadata to optimize processing speed (e.g., filter X before Y because filtering X reduces a table size by 99% and Y only reduces by 1%). In some cases, the metadata allows rejection of impossible queries (e.g., the data are analyzed to show that a query amounts to an impossible situation—for example, x=1 AND x=2). In another case, the metadata indicates that the user does not have access permission or data access permission so the preliminary plan is rejected altogether and the user is provided an indication that access permissions are denied. In 512, the logical plan is provided to the server for execution. For example, the processor is additionally configured to check security, wherein checking security comprises a user permission to execute on the server or a user permission to access a server table. In 514, user system information is provided to the server. For example, user system information comprises user custom functions, user custom definitions, user system preferences, library information for executing the updated logical plan (e.g., libraries used by the user, an indication of libraries used by the user, etc.), or metadata transformation operations (e.g., adding columns to table(s), deleting columns from table(s), adding file(s), deleting file(s), performing statistics collection operations (that change metadata), updating metadata (e.g., before average column length was 5 and now it is 10), etc.). In 516, execution of the logical plan on the server is monitored. In 518, the job is executed using a second server, if desired. For example, in the event execution using the original server is not working (e.g., execution is stuck, taking too long, server has crashed, etc.), the execution is restarted from the beginning or from an intermediate state on one or more servers (e.g. the existing server or other server(s)). In 520, execution results are received from the server.

In some embodiments the execution of the updated plan is carried out using multiple servers (e.g., a distributed process). In some embodiments, a portion of a distributed job is started again on an alternate server.

In some embodiments, messages sent from the local development system to the server comprise one or more of a CatalogOperation message, an executePlan message, an execute resilient distributed dataset (RDD) message (e.g., this would bypass the updated logical plan and would go directly to the execution phase), a resolveRelation message, a sessionOperation message, a syncState message, or a pollStatus message. A CatalogOperation message comprises a database query, a database exists query, a table exists query, a list database message, a list tables message, a drop database message, a drop tables message, a get database message, or a get tables message. Responses to a CatalogOperation message from the server to local development system comprise a true message, a false message, a list of tables with metadata (e.g., columns, column types, partition columns, create time, etc.), a success message, or a failure message. An executePlan message comprises a logical encoding of a structured query, along with user-defined functions to be executed as part of the query. A response to an executePlan message comprises one or more table rows. An executeRDD message comprises an encoding of a resilient distributed dataset (e.g., an RDD) with closures. A response to an executeRDD message comprises one or more serialized java objects. A resolveRelation message comprises a datasource specification or a table name. For example, a datasource specification comprises a list of file paths, a table identifier, a schema, set partition columns, or data source configurations. A response to a resolveRelation message comprises a schema (e.g., a column name, a set of column names, a column type, a set of column types, etc.). A sessionOperation message comprises a request to refresh a table or database. A response to a sessionOperation message comprises an acknowledgement that caches were dropped by the server. A syncState message comprises a set of files (e.g., jar—for example, java archive files). A response to a syncState message comprises an acknowledgement. A pollStatus message comprises a request for a poll status. A response to a pollStatus message comprises a list of running jobs, a number of tasks completed, a set of active tasks for each job, and a set of pending tasks for each job.

Figure 6:
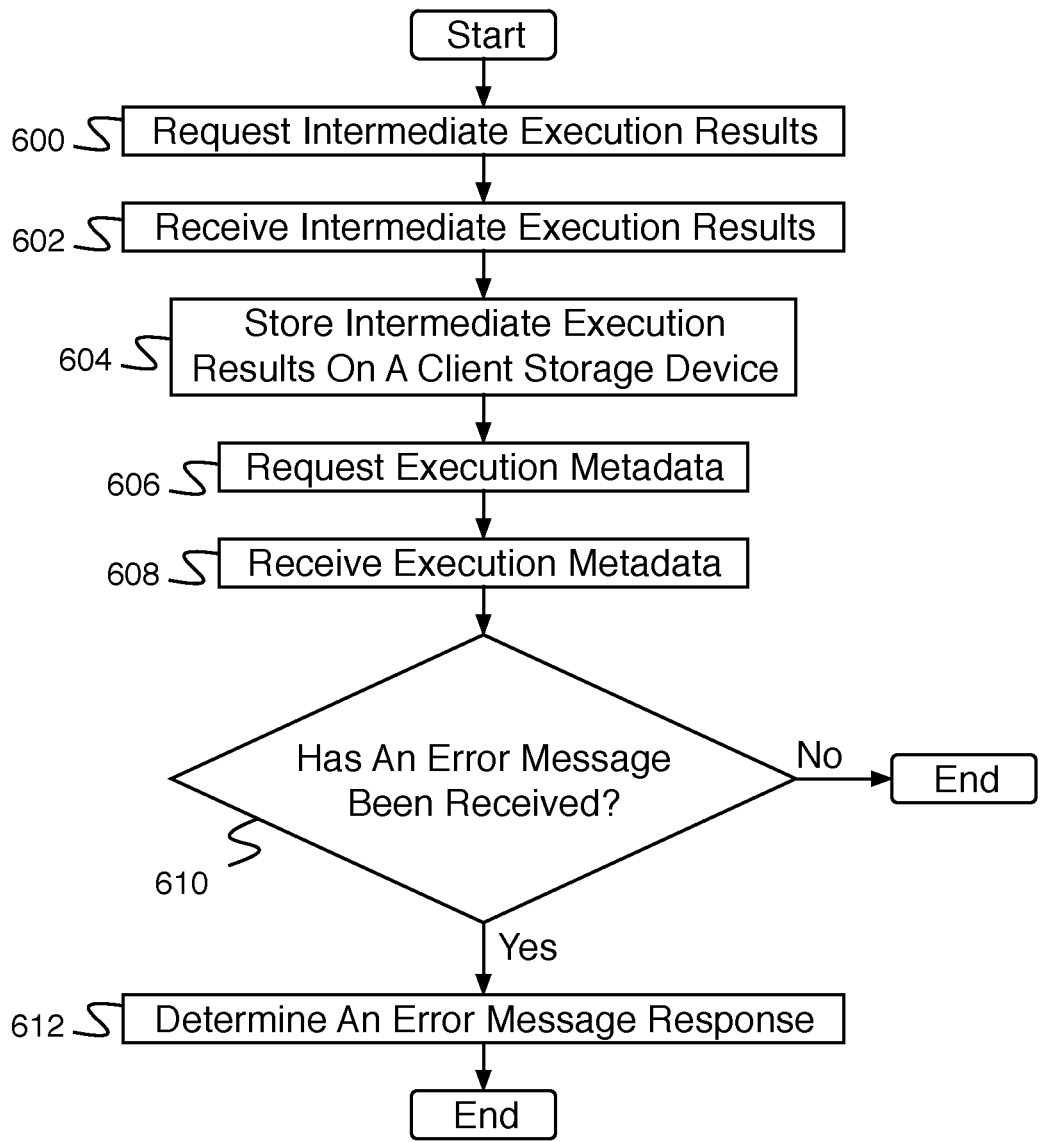
FIG. 6 is a flow diagram illustrating an embodiment of a process for monitoring execution of an updated logical plan on a server.

FIG. 6 is a flow diagram illustrating an embodiment of a process for monitoring execution of an updated logical plan on a server. In some embodiments, the process of FIG. 6 implements 516 of FIG. 5. In the example shown, in 600, intermediate execution results are requested. In 602, intermediate execution results are received. In 604, intermediate execution results are stored on a client storage device. In some embodiments, the intermediate execution results are stored in a different location (e.g., not on a client storage device) as long as the intermediate execution results are accessible by the client. Note, typically, each query is an independent unit, so in some embodiments, intermediate results are not returned within a query unit, but, in the event there are multiple queries, the end result of each query is returned. In 606, execution metadata is requested. For example, execution metadata comprises a processor loading, a processor time, a number of threads executed, a memory capacity used, a data storage amount used, a processor temperature, an error message, or any other appropriate execution metadata. In 608, execution metadata is received. In 610, it is determined whether an error message has been received. For example, an error message comprises a server unavailable error message or a version compatibility error message. In some embodiments, the message received comprises any message concerning status metadata (e.g., central processing unit (CPU) over 100 C). In the event it is determined that an error message has not been received, the process ends. In the event it is determined that an error message has been received, control passes to 612. In 612, an error message response is determined. For example, in response to a server unavailable error message, the system is configured to indicate server unavailability to a user, automatically switch to a different server, or prompt for a manual switch to a different server. For example, in response to a version compatibility error message, the system is configured to determine whether the logical plan can be executed; in the event the logical plan cannot be executed, indicate the logical plan is not compatible with the server version and indicate to update the server. As another example, error messages such as a timeout error message—the concept of taking too long, potentially contingent on the query itself (e.g., as determined using the metadata) or a load on server error message—the concept of too many people or processes on a given server lead to a response action of moving the execution of the code to a new server, issuing the creation of a virtual server and moving the execution of the code to the newly created virtual server, moving the execution of the code to an existing server or virtual server, rebooting the server that the code is executing on and restarting the execution on the rebooted server, or any appropriate response. In some embodiments, the processing of the error message is performed using a webapp and not in the client system. In some embodiments, the error message could originate on the client system (e.g., a client monitoring program determines that the execution on the server is taking too long, then the client system indicates an error in processing). In some embodiments, the reaction or response is to a general message or status message, not necessarily an error message.

Figure 7:
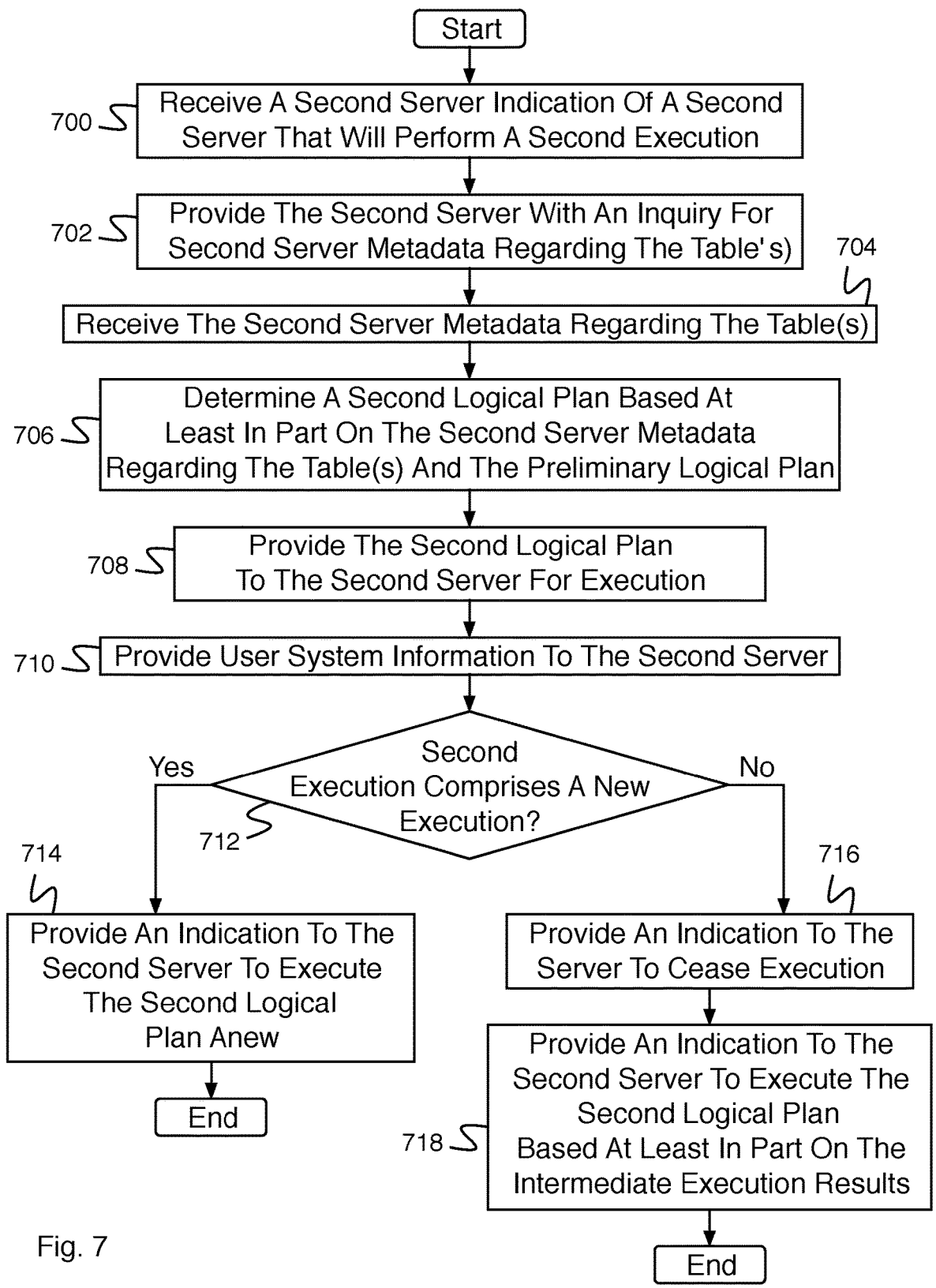
FIG. 7 is a flow diagram illustrating an embodiment of a process for executing a job using a second server.

FIG. 7 is a flow diagram illustrating an embodiment of a process for executing a job using a second server. In some embodiments, the process of FIG. 7 implements 518 of FIG. 5 in the event that executing the job using a second server is desired. In the example shown, in 700, a second server indication of a second server that will perform a second execution is received. In 702, the second server is provided with an inquiry for second server metadata regarding the table(s). In 704, the second server metadata regarding the table(s) is received. In 706, a second logical plan is determined based at least in part on the second server metadata regarding the table(s) and the preliminary logical plan. In 708, the second logical plan is provided to the second server for execution. In 710, user system information is provided to the second server. In 712, it is determined whether the second execution comprises a new execution. For example, it is determined whether the second execution comprises a new execution based on a user indication. In the event it is determined that the second execution comprises a new execution, control passes to 714. In 714, an indication is provided to the second server to execute the second logical plan anew. In the event it is determined in 712 that the second execution does not comprise a new execution, control passes to 716. In 716, an indication is provided to the server to cease execution. In 718, an indication is provided to the second server to execute the second logical plan based at least in part on the intermediate execution results (e.g., picking up where the server left off).

Figure 8:
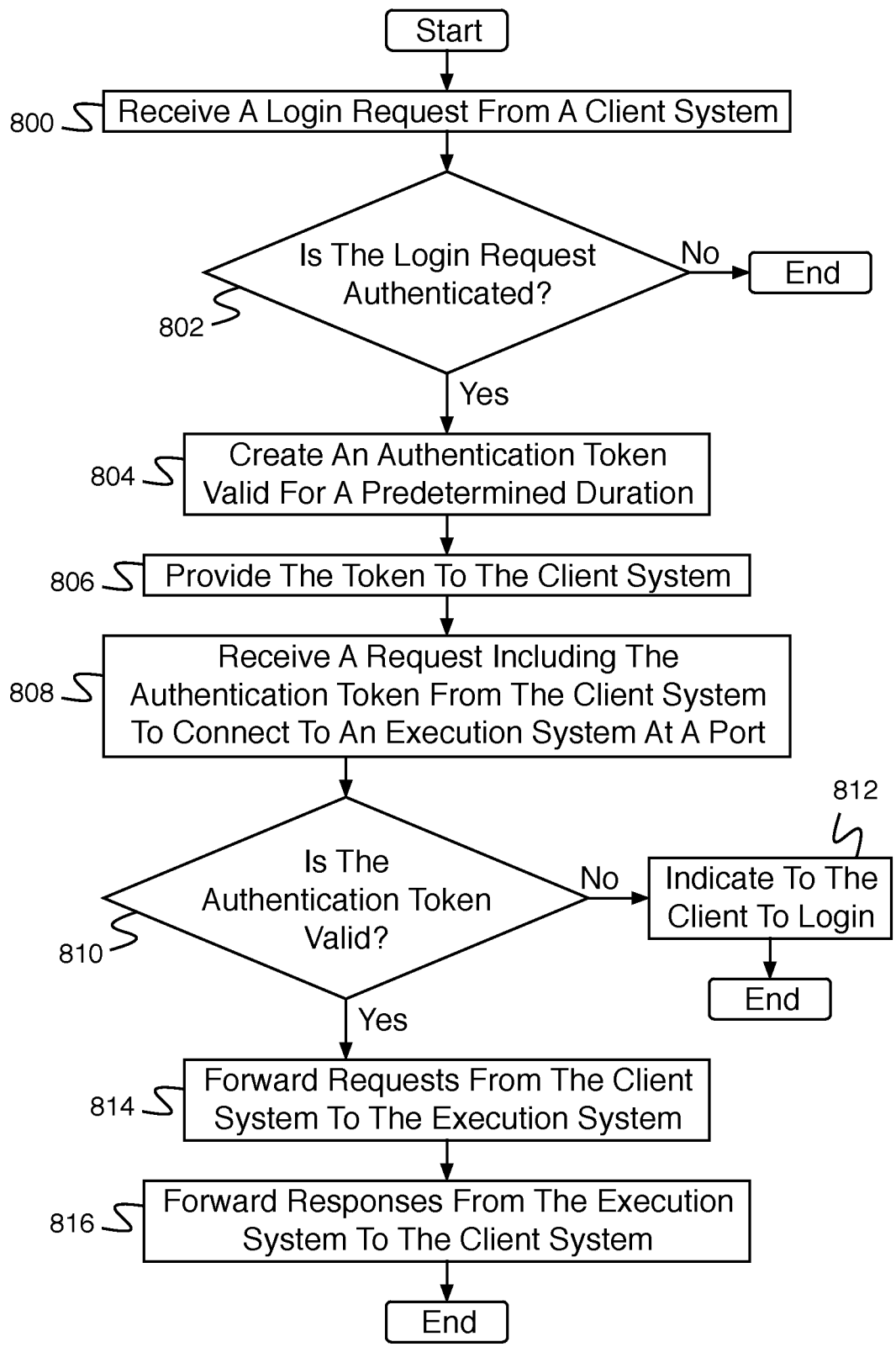
FIG. 8 is a flow diagram illustrating an embodiment of a process for a web server system.

FIG. 8 is a flow diagram illustrating an embodiment of a process for a web server system. In some embodiments, the process of FIG. 8 is executed by web server system 110 of FIG. 1. For example, the process of FIG. 8 comprises a process for connecting a client system (e.g., local development system 102 of FIG. 1 or local development system 104 of FIG. 1) with an execution system (e.g., server system 106 of FIG. 1 or cluster computing system 108 of FIG. 1). In the example shown, in 800, a login request is received from a client system. In 802, it is determined whether the login request is authenticated. For example, it is determined whether the login request is authenticated using a username and password. In the event it is determined that the login request is not authenticated, the process ends. In the event it is determined that the login request is authenticated, control passes to 804. In 804, an authentication token valid for a predetermined duration is created. In 806, the token is provided to the client system. In 808, a request including the authentication token is received from the client system to connect to an execution system at a port. In 810, it is determined whether the authentication token is valid (e.g., whether the authentication token comprises a valid authentication token and whether the authentication token has not yet expired). In the event it is determined that the authentication token is not valid, control passes to 812. In 812, the process indicates to the client to login, and the process ends. In the event it is determined in 810 that the authentication token is valid, control passes to 814. In 814, requests (e.g., execution requests, application programming interface requests, job requests, etc.) are forwarded from the client system to the execution system. In 816, responses are forwarded from the execution system to the client system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for code development and execution, comprising:
    a client interface adapted to:
        receive user code to be executed; and
        receive an indication of a server that will perform the execution; and
    a client processor adapted to:
        parse the user code to determine one or more data items referred to during the execution;
        provide the server with an inquiry for metadata regarding the one or more data items;
        receive the metadata regarding the one or more data items;
        determine a logical plan based at least in part on the metadata regarding the one or more data items;
        provide the logical plan to the server to be executed;
        receive a second server indication of a second server that will perform a second execution;
        receive an error message, a general message, or a status message, wherein the error message comprises a server unavailable message or a version compatibility error message; and
        in response to a server unavailable error message:
            indicate server unavailability to a user, automatically switch to a different server; and
            prompt for a manual switch to the different server.

2. The system of claim 1, wherein parsing the user code is used to determine a preliminary logical plan and wherein the logical plan is also based at least in part on the preliminary logical plan.

3. The system of claim 1, wherein the logical plan is updated by the server prior to execution on the server.

4. The system of claim 1, wherein the logical plan is compiled prior to being provided to the server to be executed.

5. The system of claim 1, wherein the client processor is additionally adapted to receive execution results from the server.

6. The system of claim 1, wherein the client processor is additionally adapted to monitor execution of the logical plan on the server.

7. The system of claim 6, wherein monitoring execution of the logical plan comprises: requesting intermediate execution results, receiving intermediate execution results, requesting execution metadata, receiving execution metadata, receiving server load, and/or receiving timeout metadata or execution time metadata.

8. The system of claim 6, wherein the client processor is additionally adapted to store intermediate execution results or execution metadata on a client storage device or other accessible storage device.

9. The system of claim 1, wherein the client processor is additionally adapted to provide user defined functions to the server.

10. The system of claim 1, wherein the client processor is additionally adapted to provide library information for executing the logical plan to the server.

11. The system of claim 1, wherein the client processor is additionally adapted to, in response to a version compatibility error message:
    determine whether the logical plan can be executed; and
    in response to a determination that the logical plan cannot be executed, indicate the logical plan is not compatible with a server version; and indicate to update the server.

12. The system of claim 1, wherein the client process is additionally adapted to check security, wherein security comprises a user permission to access a client, a user permission to execute on the server, a user permission to access table metadata via a server query, or a user permission to access a server data item.

13. The system of claim 12, wherein the second execution executes the logical plan anew.

14. The system of claim 12, wherein the second execution executes the logical plan based at least in part on intermediate execution results.

15. The system of claim 1, wherein metadata comprises one or more of file metadata, table metadata, directory metadata, or configuration information.

16. The system of claim 15, wherein the directory metadata comprises files in a directory, sizes of files in a directory, date created, directory name, user who created file or who owns file, and/or permission information.

17. The system of claim 15, wherein file metadata comprises file size, file owner, file creation date, file permissions, file name, and/or file deletion information.

18. The system of claim 15, wherein table metadata comprises table schema, a table column, a table column label, a table column type, a table row, a table row label, a table create time, partition columns, permission information, table statistics, and/or column statistics.

19. The system of claim 15, wherein the configuration information comprises configuration settings on how to process data, configuration of case sensitivity of table, configuration for resolving data, and/or configuration for ordering of joins.

20. The system of claim 1, wherein the client processor is additionally adapted to provide metadata transformation operations to the server, wherein metadata transformation operations comprise adding columns to a table, deleting columns from the table, adding a file, deleting the file, performing a statistics collection operation, and/or updating metadata.

21. The system of claim 1, wherein the inquiry for metadata regarding the one or more data items comprises an inquiry for all available metadata.

22. A method for code development and execution, comprising:
    receiving user code to be executed;
    receiving an indication of a server that will perform the execution;

parsing, using a processor, the user code to one or more data items referred to during the execution;
providing the server with an inquiry for metadata regarding the one or more data items;
receiving the metadata regarding the one or more data items;
determining a logical plan based at least in part on the metadata regarding the one or more data items;
providing the logical plan to the server to be executed;
receiving a second server indication of a second server that will perform a second execution;
receiving an error message, a general message, or a status message, wherein the error message comprises a server unavailable message or a version compatibility error message; and
in response to a server unavailable error message:
  indicating server unavailability to a user, automatically switch to a different server; and
  prompting for a manual switch to the different server.

23. A computer program product for code development and execution, the computer program product being embodied in a non-transitory computer readable storage medium and comprising computer instructions for:

receiving user code to be executed;
receiving an indication of a server that will perform the execution;
parsing the user code to determine one or more data items referred to during the execution;
providing the server with an inquiry for metadata regarding the one or more data items;
receiving the metadata regarding the one or more data items;
determining a logical plan based at least in part on the metadata regarding the one or more data items;
providing the logical plan to the server to be executed;
receiving a second server indication of a second server that will perform a second execution;
receiving an error message, a general message, or a status message, wherein the error message comprises a server unavailable message or a version compatibility error message; and
in response to a server unavailable error message:
  indicating server unavailability to a user, automatically switch to a different server; and
  prompting for a manual switch to the different server.

* * * * *